United States Patent
Hayashi et al.

(10) Patent No.: US 8,932,024 B2
(45) Date of Patent: Jan. 13, 2015

(54) WIND TURBINE BLADE AND WIND POWER GENERATOR USING THE SAME

(75) Inventors: Kentaro Hayashi, Nagasaki (JP); Hiroshi Nishino, Nagasaki (JP)

(73) Assignee: Mitsubishi Heavy Industries, Ltd., Minato-ku, Tokyo (JP)

( * ) Notice: Subject to any disclaimer, the term of this patent is extended or adjusted under 35 U.S.C. 154(b) by 518 days.

(21) Appl. No.: 12/934,152

(22) PCT Filed: Aug. 6, 2008

(86) PCT No.: PCT/JP2008/064161
§ 371 (c)(1), (2), (4) Date: Sep. 23, 2010

(87) PCT Pub. No.: WO2010/016125
PCT Pub. Date: Feb. 11, 2010

(65) Prior Publication Data
US 2011/0018282 A1 Jan. 27, 2011

(51) Int. Cl.
*F03D 11/00* (2006.01)
*F03D 1/06* (2006.01)

(52) U.S. Cl.
CPC .............. *F03D 11/00* (2013.01); *F03D 1/0608* (2013.01); *F03D 11/0033* (2013.01); *F05B 2240/122* (2013.01); *F05B 2250/11* (2013.01); *F05B 2250/183* (2013.01); *F05B 2260/96* (2013.01); *Y02E 10/721* (2013.01); *Y02E 10/722* (2013.01)
USPC ...................................... 416/228; 416/236 R

(58) Field of Classification Search
USPC ............ 416/62, 223 R, 228, 229 R, 235, 224, 416/226, 236 R, 241 A, 242
See application file for complete search history.

(56) References Cited

U.S. PATENT DOCUMENTS

| | | | | | |
|---|---|---|---|---|---|
| 2,450,440 | A | * | 10/1948 | Mills | 416/223 R |
| 2,884,077 | A | * | 4/1959 | Stamm et al. | 416/226 |
| 4,188,171 | A | * | 2/1980 | Baskin | 416/226 |
| 4,578,864 | A | * | 4/1986 | Hoffman | 30/295 |
| 5,533,865 | A | * | 7/1996 | Dassen et al. | 416/228 |
| 7,413,408 | B1 | * | 8/2008 | Tafoya | 416/228 |

(Continued)

FOREIGN PATENT DOCUMENTS

| | | |
|---|---|---|
| CN | 11110368 A | 10/1995 |
| EP | 0 652 367 | 5/1995 |

(Continued)

OTHER PUBLICATIONS

Korean Intellectual Property Office, "Notice of Allowance" for KR 2010-7023026, Aug. 29, 2012.

(Continued)

*Primary Examiner* — Ninh H Nguyen
(74) *Attorney, Agent, or Firm* — Benjamin Hauptman; Manabu Kanesaka; Kenneth Berner

(57) ABSTRACT

An object is to provide a wind turbine blade having a serrated plate that can be formed irrespective of the overall structure of the blade, that is attached in the optimum shape, and that can effectively suppress noise occurring at a trailing edge thereof, and also to provide a wind power generator using such a wind turbine blade. Provided is a wind turbine blade (9) formed by bonding a back skin (19) and a front skin (21) and having a serrated plate (35) attached to a trailing edge (33) thereof, and the serrated plate (35) is formed so as to be attached by bonding the back skin (19) and the front skin (21).

8 Claims, 5 Drawing Sheets

(56) References Cited

U.S. PATENT DOCUMENTS

| | | | |
|---|---|---|---|
| 2003/0099546 A1* | 5/2003 | Stiesdal et al. | 416/228 |
| 2008/0187442 A1* | 8/2008 | Standish et al. | 416/235 |
| 2009/0290982 A1* | 11/2009 | Madsen et al. | 416/61 |

FOREIGN PATENT DOCUMENTS

| | | |
|---|---|---|
| EP | 1 314 885 | 5/2003 |
| JP | S58-135379 | 8/1983 |
| JP | 2000-120524 | 4/2000 |
| JP | 2003-336572 | 11/2003 |
| WO | WO 2008/003330 | 1/2008 |

OTHER PUBLICATIONS

Japan Patent Office, "Decision to Grant a Patent for JP 2010-523684", Jul. 2, 2013.

* cited by examiner

WIND TURBINE BLADE AND WIND POWER GENERATOR USING THE SAME

RELATED APPLICATIONS

The present application is National Phase of International Application No. PCT/JP2008/064161 filed Aug. 6, 2008, the disclosure of which is hereby incorporated by reference herein in its entirety.

TECHNICAL FIELD

The present invention relates to wind turbine blades and wind power generators that generate electricity using such wind turbine blades.

BACKGROUND ART

One problem with wind power generators is noise caused by blades. Recently, the size of wind power generators has been increased with the growing demand for high-power wind power generators. Accordingly, the rotor diameter, that is, the length of the wind turbine blades, has increased.

The longer the blades are, the faster the blade tips move. Accordingly, a larger amount of noise occurs, and a further noise reduction has been demanded.

The major sources of noise caused by blades are noise due to vortices at the tips of the blades and noise due to turbulence boundary layers occurring on the surfaces of the blades.

In the related art, to reduce the noise level, it is thought to be effective to reduce the rotational speed of a rotor. That is, if the rotational speed of the rotor is reduced, the flow speed of air to the blades is decreased, so that aerodynamic sound can be reduced. However, if the rotational speed of the rotor is reduced, the power generation efficiency is decreased.

To reduce noise without reducing the rotational speed of the rotor, for example, as disclosed in Patent Citation 1, a technique called serration has been proposed.

This is intended to suppress Karman vortices from a trailing edge of a blade by forming a serrated portion at the trailing edge so as to cause longitudinal vortices. By suppressing Karman vortices, noise is reduced.

Patent Citation 1:
Japanese Unexamined Patent Application, Publication No. 2003-336572

DISCLOSURE OF INVENTION

The blade disclosed in Patent Citation 1 has low flexibility in fabrication because serrations are molded integrally with the overall blade or are fixed to the blade with bolts.

That is, the blade disclosed in Patent Citation 1 has serrations forming a portion of the blade, namely, an extended portion of the blade. In other words, the serrations are formed such that the trailing edge of the airfoil is cut in a serrated pattern.

In general, a blade has an angle of attack with respect to the wind flow, and consequently a flow (cross flow) occurs at the trailing edge of the blade in a direction from the front side (lower surface) to the back side (upper surface) of the blade.

Thus, serrations formed as an extended portion of a blade can themselves disturb the flow and therefore serve as a new source of noise.

In addition, if a blade is attached with bolts, the bolted portions can serve as a new source of noise.

In light of the above circumstances, the present invention provides a wind turbine blade having a serrated plate that can be formed irrespective of the overall structure of the blade and that can be attached in the optimum shape to effectively suppress noise occurring at the trailing edge thereof, and also provides a wind power generator using such a wind turbine blade.

To solve the above problem, the present invention employs the following solutions.

A first aspect of the present invention provides a wind turbine blade formed by bonding a back skin and a front skin and having a serrated plate attached to a trailing edge thereof, and the serrated plate has a serrated portion on a rear side thereof and is formed so as to be attached by bonding the back skin and the front skin.

The wind turbine blade according to this aspect is formed by bonding the back skin and the front skin, whereas the serrated plate having the serrated portion on the rear side thereof is formed so as to be attached by bonding the back skin and the front skin; that is, the serrated plate is attached when the overall structure of the wind turbine blade, in other words, the joint structure of the back skin and the front skin, is formed.

Accordingly, the serrated plate can be formed irrespective of the joint structure of the back skin and the front skin, so that it can be attached in the optimum shape to avoid noise, for example, a shape that can suppress formation of a cross flow, thus effectively suppressing noise occurring at the trailing edge.

Large noise occurs at an end portion of the wind turbine blade, where the flow speed is high; therefore, in view of efficiently reducing noise, the serrated plate is preferably provided at the end portion. The end portion at which the serrated plate is provided is, for example, within 30%, more preferably within 20%, of the blade length from a blade tip toward a blade root.

In the above aspect, the back skin and the front skin may be bonded with an adhesive, and the serrated plate may be inserted between the back skin and the front skin and be fixed with the adhesive.

If the serrated plate is prepared independently of the back skin and the front skin and the back skin and the front skin are bonded with an adhesive, a portion of the serrated plate on the blade side is inserted between the back skin and the front skin and is inserted into an adhesive layer present therebetween. As the adhesive is dried, the back skin and the front skin are fixed, and accordingly the serrated plate is fixed.

In this way, because the serrated plate is fixed by bonding the back skin and the front skin, no special attachment is required for attachment of the serrated plate, thus facilitating the attachment procedure.

In addition, the serrated plate can be formed in the optimum shape to avoid noise, for example, a shape that can suppress formation of a cross flow, thus effectively suppressing noise occurring at the trailing edge.

In the above configuration, an insertion portion of the serrated plate may have at least one protrusion protruding toward the back skin and/or the front skin.

By doing so, a large resistance is caused by the protrusion, thus effectively preventing the serrated plate from coming off.

In the above aspect, the serrated plate may be formed integrally with one of the back skin and the front skin, and an end of the other shell may be fitted to the shell.

The serrated plate is formed integrally as a trailing-edge portion of the back skin or the front skin. Because the back skin and the front skin are separately formed, the serrated plate can be formed irrespective of the joint structure of the back skin and the front skin. Accordingly, the serrated plate can be formed in the optimum shape to avoid noise, for example, a shape that can suppress formation of a cross flow, thus effectively suppressing noise occurring at the trailing edge.

In the above aspect, the serrated plate preferably has a shape extending along a streamline at the trailing edge.

By doing so, a wind flow flows along the serrated plate, so that the formation of a flow from the front side (lower surface) to the back side (upper surface) of the blade, namely, a cross flow, is suppressed, thus inhibiting formation of a new source of noise.

A second aspect of the present invention provides a wind power generator that generates electricity using a wind turbine blade that can effectively suppress noise occurring at a trailing edge thereof.

By doing so, noise can be reduced during the operation of the wind power generator. This alleviates limitations due to noise, thus ensuring flexibility of installation sites; for example, it can be installed near a residential area.

According to the present invention, because the wind turbine blade is formed by bonding the back skin and the front skin and, on the other hand, the serrated plate having the serrated portion on the rear side thereof is formed so as to be attached by bonding the back skin and the front skin, the serrated plate can be attached in the optimum shape to avoid noise, for example, a shape that can suppress formation of a cross flow, thus effectively suppressing noise occurring at the trailing edge.

EXPLANATION OF REFERENCE

Figure 1:
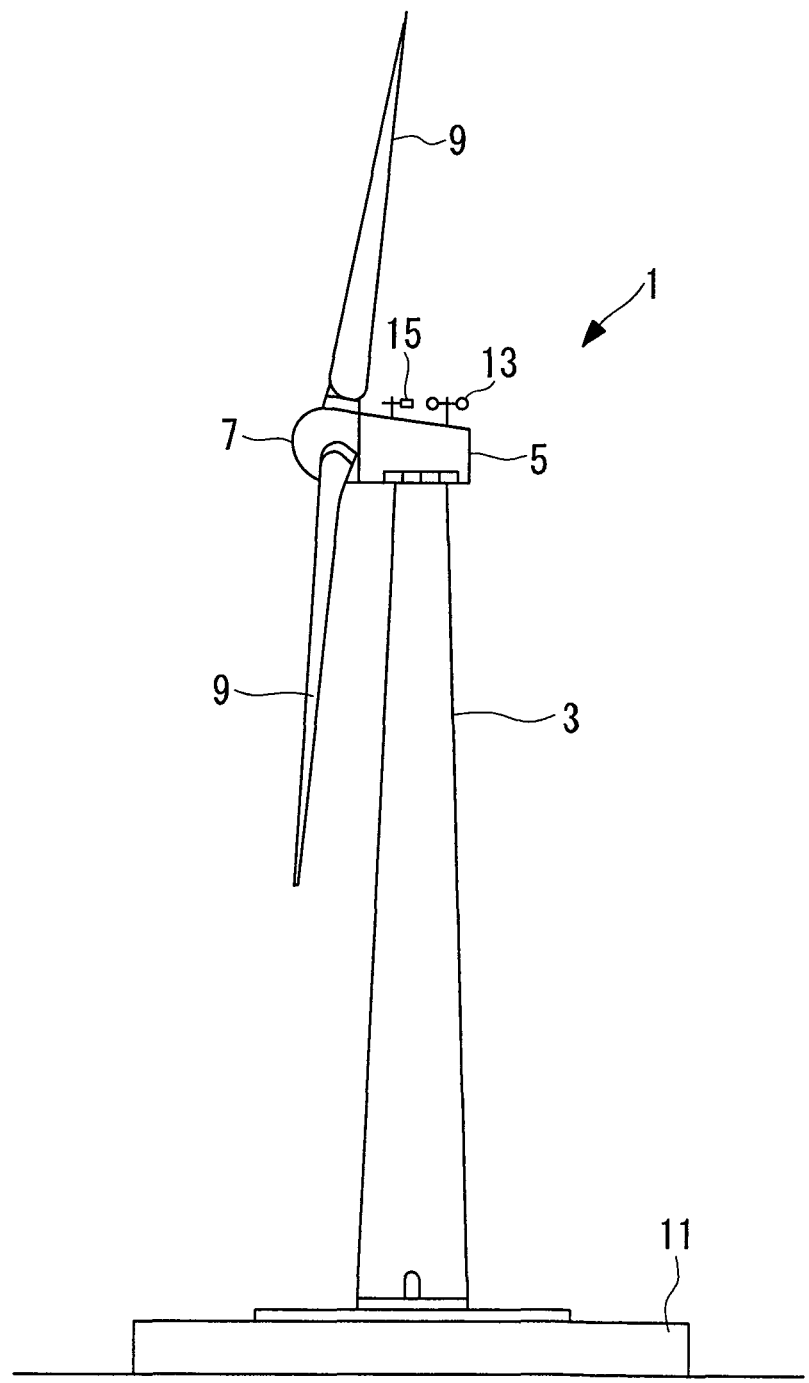
FIG. 1 is a side view schematically showing the overall structure of a wind power generator according to a first embodiment of the present invention.

1: wind power generator
9: wind turbine blade
19: back skin
21: front skin
29: flow
33: trailing edge
35: serrated plate
37: serrated portion
39: adhesive layer
41: insertion portion
43: protrusion

BEST MODE FOR CARRYING OUT THE INVENTION

First Embodiment

A wind power generator 1 according to an embodiment of the present invention will be described below on the basis of the drawings.

FIG. 1 is a side view schematically showing the overall structure of the wind power generator 1.

As shown in FIG. 1, the wind power generator 1 includes a tower 3 provided in an upright position on a foundation 11, a nacelle 5 installed on the top end of the tower 3 so as to be rotatable substantially horizontally, with the tower 3 serving as a pivot, a rotor head 7 provided on the nacelle 5 so as to be rotatable about a substantially horizontal axis, and a plurality of wind turbine blades 9 attached to the rotor head 7 so as to extend radially around the rotation axis thereof and to be rotatable about the blade length direction.

The force of wind striking the wind turbine blades 9 in the rotation axis direction of the rotor head 7 is converted into power rotating the rotor head 7 about the rotation axis direction thereof.

An anemometer 13 for measuring ambient wind speed value, an anemoscope 15 for measuring wind direction, and an arrester (not shown) are provided at appropriate positions (for example, the top) on the peripheral surface of the nacelle 5.

A generator (not shown) coupled to the rotor head 7 via a gearbox (not shown) coaxial therewith is installed in the nacelle 5. That is, the generator is driven while accelerating the rotation of the rotor head 7 using the gearbox to attain generator output.

Figure 2:
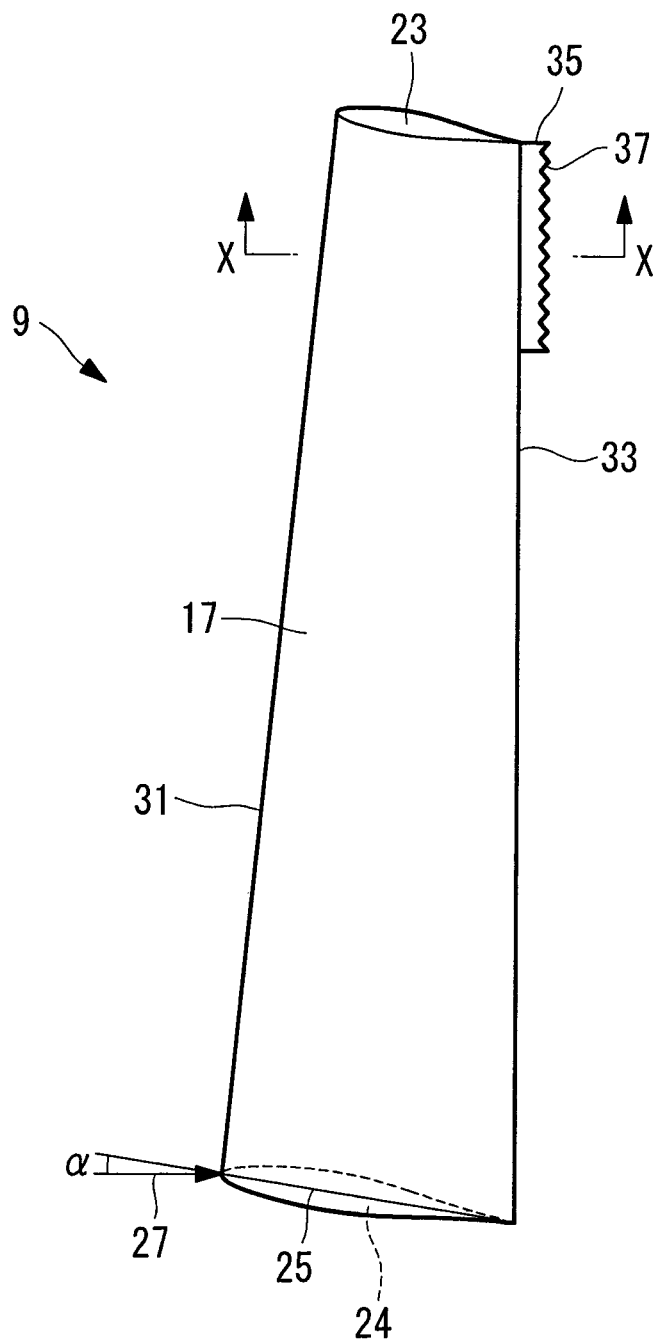
FIG. 2 is a front view of a wind turbine blade according to the first embodiment of the present invention.
Figure 3:
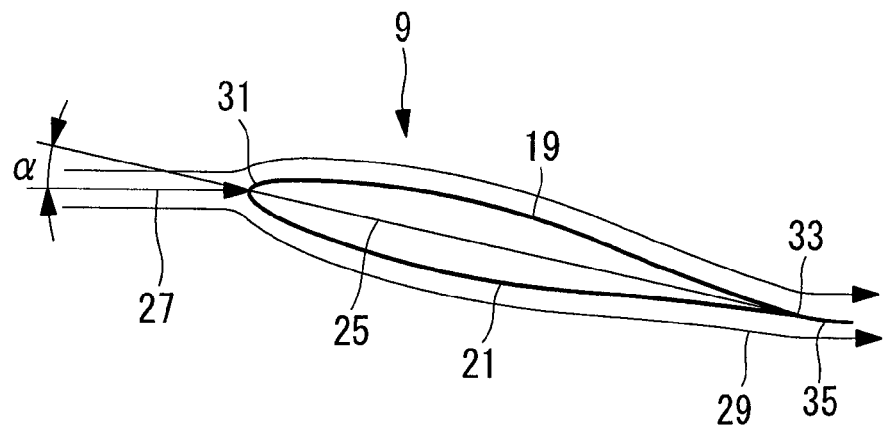
FIG. 3 is a sectional view along X-X in FIG. 2.

FIG. 2 is a front view of a wind turbine blade 9. FIG. 3 is a sectional view along X-X in FIG. 2.

The wind turbine blade 9 is a hollow member having an airfoil shape in cross section. The airfoil shape of the wind turbine blade 9 is defined by a skin 17 formed of, for example, a fiberglass reinforced plastic. The skin 17 is composed of two half segments bonded to each other, namely, a back skin 19 and a front skin 21, and is reinforced inside by, for example, a main girder (not shown).

In use, the wind turbine blade 9 is arranged such that a blade chord 25 has a certain angle with respect to a wind direction 27. This angle is referred to as the angle of elevation attack a.

As shown in FIG. 3, a wind flow (streamline) 29 around the wind turbine blade 9 is introduced along a wind direction 27 toward a leading edge 31, flows along the back skin 19 and the front skin 21, and flows in a direction along the wind direction 27 at a trailing edge 33. The flow 29 at the trailing edge 33 is typically a flow from the front skin 21 to the back skin 19.

A serrated plate 35 is provided at a portion of a blade tip 23 side (end portion) at the trailing edge 33 of the wind turbine blade 9. The length of the serrated plate 35 in the blade length direction is, for example, substantially 20% of the blade length from the blade tip 23 toward a blade root 24.

This is intended to efficiently reduce noise by providing the serrated plate 35 at a portion where the flow speed is high, that is, where large noise occurs; from this viewpoint, depending on the length of the wind turbine blade 9, the length of the serrated plate 35 in the blade length direction is within 30%, more preferably within 20%, of the blade length from the blade tip 23 toward the blade root 24.

If a further noise reduction is desired without much consideration of the efficiency of noise reduction, for example, the serrated plate 35 may be provided over the entire blade length.

Figure 4:
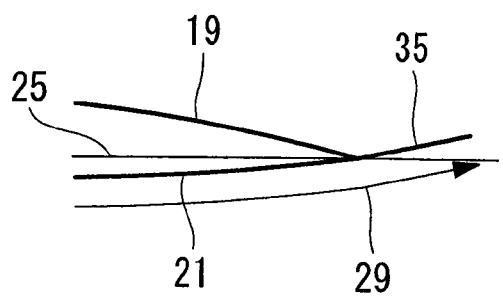
FIG. 4 is a partial enlarged view showing a trailing-edge portion of the wind turbine blade according to the first embodiment of the present invention.

The serrated plate 35 is plate-shaped, is flat along the flow 29, as shown in FIGS. 3 and 4, and has a serrated portion 37 on the rear side thereof, as shown in FIG. 2.

Figure 5:
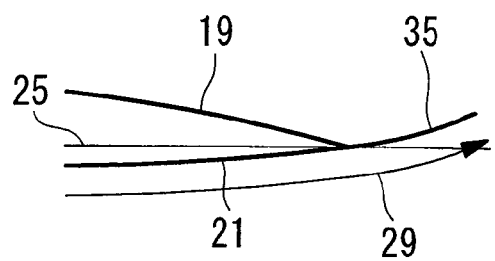
FIG. 5 is a partial enlarged view showing another form of the trailing-edge portion of the wind turbine blade according to the first embodiment of the present invention.

As shown in FIG. 5, the serrated plate 35 may be curved along the flow 29. By doing so, the flow 29 can be allowed to flow more smoothly along the serrated plate 35.

Figure 6:
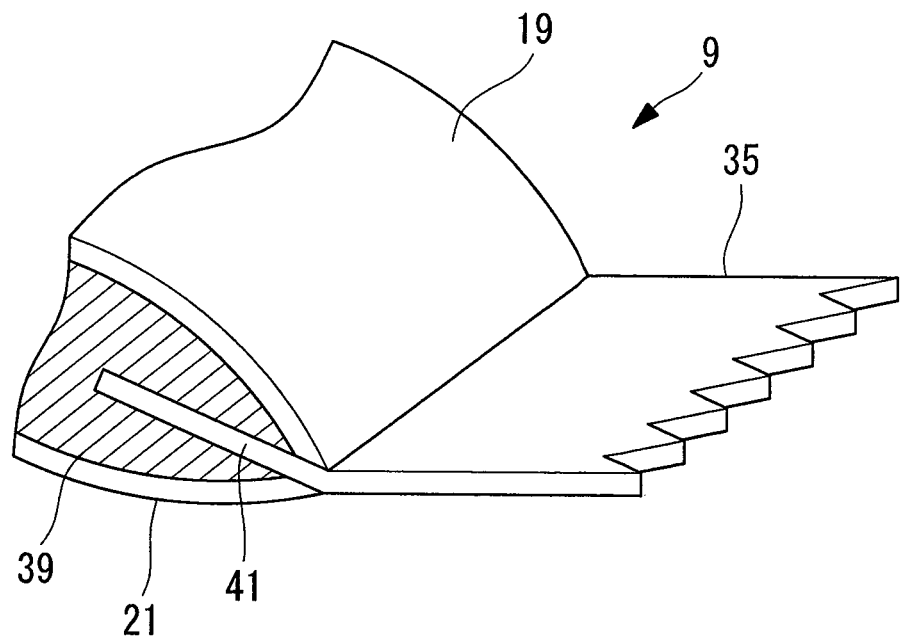
FIG. 6 is a partial perspective view showing the attachment structure of a serrated plate according to the first embodiment of the present invention.

FIG. 6 shows the attachment structure of the serrated plate 35.

The serrated plate 35 is held between the back skin 19 and the front skin 21 at the trailing edge 33, with the front thereof extending into a space surrounded by the back skin 19 and the front skin 21. That is, a bent insertion portion 41 inserted into an adhesive layer (adhesive) 39 bonding the back skin 19 and the front skin 21 at the trailing edge 33 is provided in the front of the serrated plate 35.

In other words, the insertion portion 41 of the serrated plate 35 is held and retained between the back skin 19 and the front skin 21 at the trailing edge 33 and is fixed and retained by the adhesive layer 39.

The wind turbine blade 9 is produced as follows.

First, the back skin 19, the front skin 21, the reinforcement such as the main girder, and the serrated plate 35 are molded in predetermined shapes.

For example, the front skin 21 is placed with the inner side thereof facing upward. An end of the reinforcement, such as the main girder, is bonded to the front skin 21. An adhesive is then applied to the other end of the reinforcement, such as the main girder, and the adhesive layer 39 is put on the peripheral portion, including the leading edge 31 and the trailing edge 33.

After an adhesive is similarly applied to the back skin 19, the back skin 19 is placed on the front skin 21 while being positioned. At the same time, the insertion portion 41 of the serrated plate 35 is inserted into the adhesive layer 39 and is held and retained between the back skin 19 and the front skin 21.

In this state, as the adhesive layer 39 etc. are dried, the back skin 19 and the front skin 21 are fixed, and accordingly the serrated plate 35 is fixed.

In this way, because the serrated plate 35 is fixed by bonding the back skin 19 and the front skin 21, no special attachment is required for attachment of the serrated plate 35, thus facilitating the attachment procedure.

Figure 7:
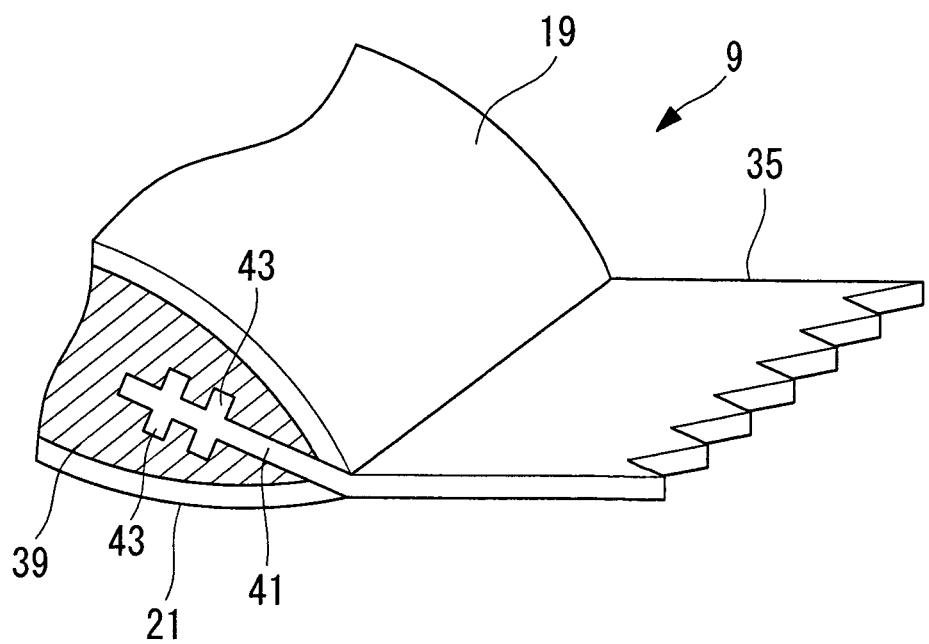
FIG. 7 is a partial perspective view showing the attachment structure of another form of the serrated plate according to the first embodiment of the present invention.

In this embodiment, the insertion portion 41 is plate-shaped; as shown in FIG. 7, it may have protrusions 43 protruding toward the back skin 19 and the front skin 21 and extending in the blade length direction.

By doing so, a large resistance is caused by the protrusions 43 against the direction in which the insertion portion 41 comes off, thus effectively preventing the serrated plate 35 from coming off.

Next, the operation of the thus-configured wind power generator 1 will be described.

In operation, the wind power generator 1 measures wind direction using the anemoscope 15. The nacelle 5 is rotated on the basis of the measurement results so that the wind blows in the rotation axis direction of the rotor head 7. That is, the wind blows the wind turbine blade 9 in a predetermined direction.

As the wind strikes the wind turbine blade 9, a lift occurs in a direction crossing the blade surface. The lift moves the wind turbine blade 9, thus rotating the rotor head 7 about the rotation axis thereof.

The generator is driven while accelerating the rotation of the rotor head 7 using the gearbox to generate electricity.

The pitch angle of the wind turbine blade 9 is adjusted by rotating it about the blade length direction depending on the wind speed measured by the anemometer 13. If the wind speed is low, the pitch angle is increased to increase the wind-receiving area. If the wind speed exceeds the rotational speed at which the rated output is reached, that is, the rated rotational speed, the pitch angle is decreased to decrease the wind-receiving area.

At this time, because the serrated plate 35 is provided at the trailing edge 33 along the blade length direction, the serrated portion 37 suppresses formation of a Karman vortex street behind the trailing edge of the wind turbine blade 9. Thus, noise due to a Karman vortex street can be reliably suppressed.

In this embodiment, additionally, because the portion of the serrated plate 35 protruding from the trailing edge 33 has a shape extending along the flow 29 at the trailing edge 33, the flow 29 flows along the serrated plate 35. This suppresses formation of the flow from the front skin 21 to the back skin 19 at the trailing edge of the serrated portion 37 of the serrated plate 35, namely, a cross flow, thus inhibiting formation of a new source of noise.

This effectively suppresses noise occurring at the trailing edge 33.

In this embodiment, additionally, because the wind turbine blade 9 has the serrated plate 35 at the end portion thereof, where large noise occurs because of the high movement speed, noise can be efficiently reduced.

This eliminates the need for reducing the rotational speed for noise reduction, thus inhibiting a decrease in performance, such as power generation efficiency, in the wind power generator 1.

Second Embodiment

Next, a second embodiment of the present invention will be described using FIGS. 8 and 9.

In this embodiment, the basic structure is similar to that of the first embodiment, but it differs in the structure of the trailing edge 33 of the wind turbine blade 9. In this embodiment, therefore, this difference will be described, and a redundant description of the other portions will be omitted.

The same elements as those of the first embodiment are denoted by the same references, and a detailed description thereof will be omitted.

Figure 8:
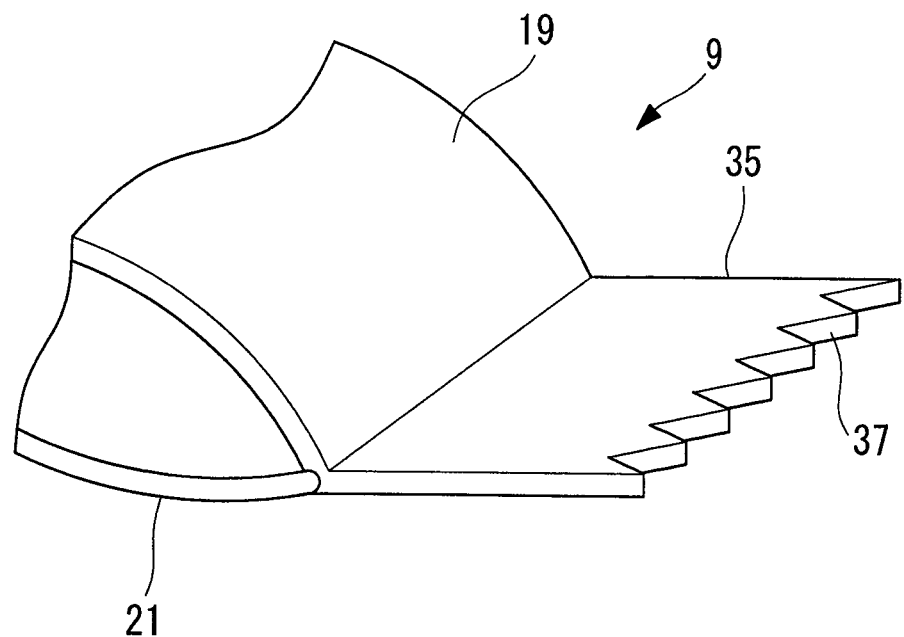
FIG. 8 is a partial perspective view showing the attachment structure of a serrated plate according to a second embodiment of the present invention.
Figure 9:
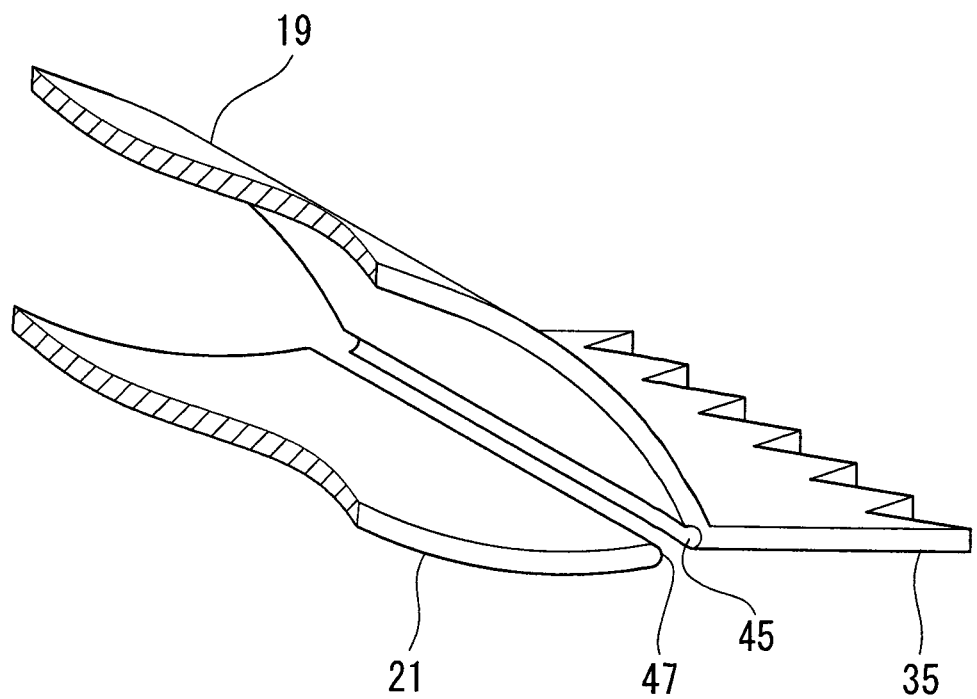
FIG. 9 is a partial perspective view showing the joint structure of a back skin and a front skin according to the second embodiment of the present invention.

FIG. 8 is a partial perspective view showing the attachment structure of the serrated plate 35. FIG. 9 is a partial perspective view showing the joint structure of the back skin 19 and the front skin 21.

The serrated plate 35 is formed integrally with the back skin 19 as a trailing-edge extended portion of the back skin 19.

The serrated plate 35 is angled with respect to the back skin 19 so as to extend along the flow 29 during the assembly of the wind turbine blade 9.

A fitting groove 45 extending in the blade length direction is formed on the inner side of the boundary between the back skin 19 and the serrated plate 35, that is, on the front skin 21 side.

On the other hand, a fitting portion 47 that fits into the fitting groove 45 is formed at the end of the front skin 21 at the trailing edge 33.

For this wind turbine blade 9, the back skin 19 integrated with the serrated plate 35, the front skin 21, and the reinforcement such as the main girder are molded in predetermined shapes.

Thus, because the back skin 19 and the front skin 21 are separately formed, the serrated plate 35 can be formed irrespective of the joint structure of the back skin 19 and the front skin 21 (wind turbine blade 9). Accordingly, the serrated plate 35 can be formed in the optimum shape to avoid noise, that is, a shape extending along the flow 29.

Next, for example, the back skin 19 is placed with the inner side thereof facing upward. An end of the reinforcement, such as the main girder, is bonded on top of the back skin 19. An adhesive is then applied to the other end of the reinforcement, such as the main girder, and an adhesive is applied to the peripheral portion, including the leading edge 31 and the trailing edge 33.

After an adhesive is similarly applied to the front skin 21, the front skin 21 is placed on the back skin 19 while being positioned. At this time, at the trailing edge 33, the position of the fitting portion 47 of the front skin 21 is adjusted so as to fit into the fitting groove 45 of the back skin 19, thus bonding the back skin 19 and the front skin 21.

In this way, because the serrated plate 35 is fixed by bonding the back skin 19 and the front skin 21, no special attachment is required for attachment of the serrated plate 35, thus facilitating the attachment procedure.

In addition, the back skin 19 and the front skin 21 can be reliably and accurately fixed together by fitting the fitting portion 47 into the fitting groove 45. This also allows the serrated plate 35 to be reliably positioned.

The fitting groove 45 may be a hole having any shape, and the fitting portion 47 may be a protrusion that fits into that hole.

In addition, the serrated plate 35 may be attached integrally to the front skin 21 side, rather than to the back skin 19 side.

The operation of the thus-configured wind power generator 1 is substantially the same as that of the first embodiment, and a redundant description thereof will be omitted here.

The present invention is not limited to the embodiments described above; it may be changed without departing from the spirit thereof.

The invention claimed is:

1. A wind turbine blade comprising:
    a back skin and a front skin bonded together;
    a serrated plate attached to a trailing edge thereof, the serrated plate having a serrated portion on a rear side thereof;
    a fitting groove extending in a blade length direction formed on an inner side of a boundary between the back skin and the serrated plate on a front skin side; and
    a fitting portion formed at an end of the front skin at the trailing edge for fitting into the fitting groove,
    wherein the serrated plate is formed integrally with one of the back skin and the front skin, and an end of another of the back skin and the front skin is fitted to said one of the back skin and the front skin,
    wherein the serrated plate has a plate-shape and is disposed along a wind flow at the trailing edge of the front skin to the toward a back skin side,
    wherein the back skin and the front skin are fixed together at the fitting portion into the fitting groove and thereby, the serrated plate is formed integrally with the back skin,
    wherein each of the back skin and the front skin is one plate member,
    wherein the serrated plate is a part of the back skin, and
    wherein the fitting groove has a semicircular concave portion concaved from an inner surface of the boundary between the back skin and the serrated plate, and the fitting portion has a semicircular convex portion convexed from the end of the front skin at the trailing edge to fit into the concave portion.

2. The wind turbine blade according to claim 1, wherein the serrated plate has a shape extending along a streamline at the trailing edge.

3. A wind power generator that generates electricity using the wind turbine blade according to claim 1.

4. The wind turbine blade according to claim 1, wherein the serrated plate is disposed from a blade tip to a blade root, and a length of the serrated plate in a blade length direction is 20-30% of a blade length from the blade tip to the blade root.

5. The wind turbine blade according to claim 1, wherein the serrated plate is curved upwardly to a side of the front skin for a smooth flow of the wind flow.

6. The wind turbine blade according to claim 1, wherein the serrated plate includes an inclined portion outside the insertion portion, the serrated plate being inclined at the inclined portion toward the back skin side and extending along the wind flow of the front skin.

7. The wind turbine blade according to claim 6, wherein the insertion portion of the serrated plate has two protruding portions, each protruding toward the back skin and the front skin, arranged in a direction parallel to each other.

8. The wind turbine blade according to claim 1, wherein the back skin and the front skin are connected at the trailing edges along the blade length direction other than a portion of the back skin formed with the serrated plate where the fitting portion fits into the fitting groove.

* * * * *